Patented June 14, 1938

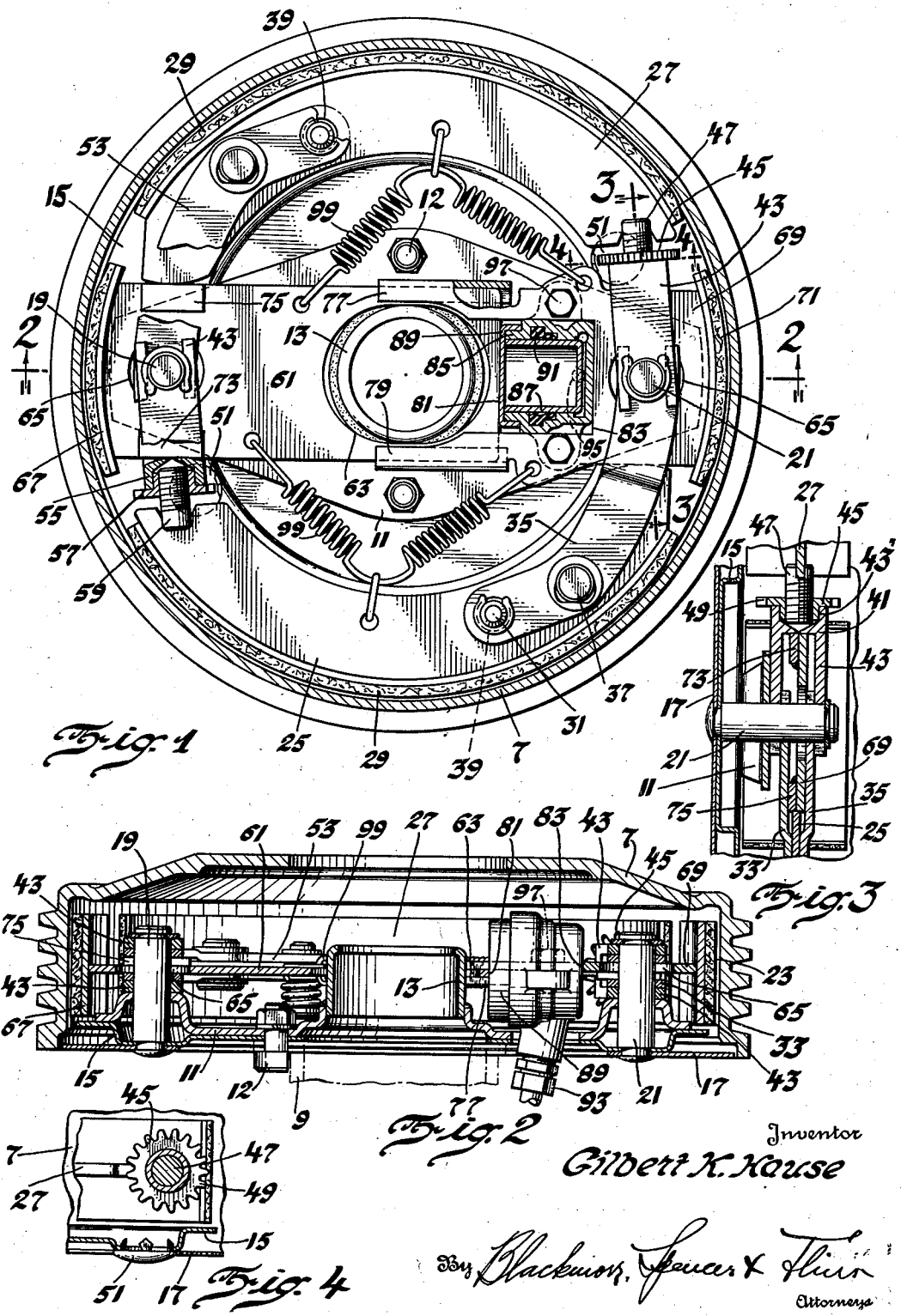
June 14, 1938.  G. K. HAUSE  2,120,917
BRAKE MECHANISM
Filed June 3, 1936

2,120,917

UNITED STATES PATENT OFFICE 2,120,917

BRAKE MECHANISM

Gilbert K. Hause, Dayton, Ohio, assignor to General Motors Corporation, Detroit, Mich., a corporation of Delaware Application June 3, 1936, Serial No. 83,185

5 Claims. (Cl. 188—152)

This invention relates to brakes and particularly to internal expanding brakes for use on vehicles.

An object of the invention is to provide brake mechanism associated with a rotating drum whereby much the larger part of the annular drum surface is frictionally engaged to retard drum rotation.

A further object is to provide the same effective retarding action for either direction of drum rotation.

As a further object the invention aims to minimize manual effort through the instrumentality of servo shoes adapted to be brought into drum contact by manual effort and to themselves actuate the main shoes.

Still further the main shoes are designed to readily accommodate themselves to the drum contour by means of an articulated form of anchorage.

Other objects and advantages will be understood from the following description.

The invention is illustrated by the accompanying drawing in which Fig. 1 is a sectional view through the drum, showing in elevation, partly in section, the shoes and the operating mechanism.

Fig. 2 is a section on line 2—2 of Fig. 1.

Fig. 3 is a section on line 3—3 of Fig. 1.

Fig. 4 is a section on line 4—4 of Fig. 1.

Referring by reference characters to the drawing, numeral 7 is used to designate a conventional brake drum, such a drum as is usually carried by each of the wheels of a motor vehicle. The drawing shows the invention applied to one of the rear wheels, the similar application to the front wheels not being illustrated. To the axle housing 9 at the rear wheels is secured by fastening means 12 an anchor plate 11 to which is secured a pivot hub 13. A light backing plate 15 and a dust and splash shield 17 complete the closure of the drum. Diametrically opposite anchor pins 19 and 21 are carried by the anchor plate 11. Within the drum and positioned to frictionally engage its annular surface 23 are main shoes 25 and 27, each having suitable frictional lining 29. Pivoted upon opposite faces of the web of shoe 25 at 37 are links 33 and 35. Limited movement about pivot 37 is afforded by a friction pin 31 carried by the links and extending through an enlarged opening 39 in the shoe. The ends of links 33 and 35 are recessed to engage anchor pin 21 as seen in Fig. 1 and Fig. 3. A yoke 41 has arms 43 overlapping links 33 and 35 and having similar recessed ends to engage anchor pin 21. At its head, yoke 41 is recessed at 43' to rotatably receive a nut 45 threaded upon a screw 47 forked at its end to engage the web of shoe 27. The nut has external teeth 49. Access to teeth 49 is had by removing a cap 51 snapped into plate 15. Rotation of the nut adjusts the shoe clearance since the nut remains in contact with the yoke. Adjacent the anchor pin 19, shoe 27 is provided with articulating links 53 resembling in structure and function the links 33 and 35. Also adjacent anchor pin 19, shoe 25 has a similar provision for adjustment and for anchoring on the pin 19. This is constituted by yoke 55, nut 57 and screw 59.

A flat plate 61 has an elongated opening 63 surrounding hub 13 and having a shorter diameter of such length that it may be guided for axial movement by said hub, and also to be free to rotate about the hub. This plate 61 has an opening 65 freely surrounding pin 19 and is terminally provided with a servo shoe 67 adapted to engage the drum when projected radially into contact with the latter. A second flat plate 69 has a servo shoe 71 diametrically opposite shoe 67. The two servo shoes are therefore between the adjacent ends of main shoes 25 and 27. It will be observed that the flat plates (plate 69 in Fig. 3) straddle the anchor pins within the arms of the yoke and also between the links 33 and 35. These plates on either side of the anchor pins have welded thereto reinforcements 73 and 75 at their edges. One edge of these plates with reinforcement 73 engages the head of the yoke 41 between its arms 43. The other edge with its reinforcement 75 engages the end of the web of the shoe (shoe 25 in Fig. 3). Plate 69 inwardly adjacent the hub 13 is formed with forked ends 77 and 79 turned over the adjacent edges of plate 61 so the plates 61 and 69 may reciprocate axially relative to each other but rotate together as a unit. Between the end wall 81 of plate 61 and the region 83 between the forked ends of plate 69 is located what corresponds to the wheel cylinder of a hydraulic brake applying means. There is a cylinder 85 within which is a hollow piston 87. A cap 89 closes the open end of the piston and contacts the wall 81 on one side and the ends of the cylinder 85 and piston 87 on its other side. There is a seal 91 carried by the cylinder and engaging the piston to prevent leakage. Suitable hydraulic medium from a conventional master cylinder not shown passes through a conduit 93 in the cylinder 85 through an opening 95. It will be understood that a conventional brake pedal serves as the instrumentality by which the master cylinder actuates the wheel cylinders. The cylinder 85 is fixed by fastening means 97 to the reciprocable plate 69 and to accommodate its motion a suitable opening in the anchor plate is shown in Fig. 2. Springs 99 are attached to the main shoes and to the sliding flat plates and operate to draw the plates 61 and 69 together and to release the shoes from contact with the drum.

The operation is as follows: The parts may be assumed to be in the positions shown when the brake is not operated. When fluid is forced into the cylinder 85 the plates 61 and 69 are forced apart, the movements being equalized, shoes 67 and 71 engaging the rotating drum. If the drum is rotating counterclockwise, the direction corresponding to forward travel, shoes 67 and 71 are similarly rotated with and by the drum. The upper edge of plate 69 and the lower edge of plate 61 with their reinforcements engage the yokes 41 between their arms and push the main shoes against the drum, these shoes having an articulated anchorage through the instrumentality of links 33 and 35 whereby the shoes may accurately conform to the drum surface. If the drum is rotating in the opposite direction, both shoes are similarly applied, but in this case the plates 61 and 69 engage the webs of the shoes and the shoes anchor by means of the articulated adjustable yokes.

By these provisions a single hydraulic wheel cylinder only is required. In either direction of rotation both shoes engage the drum throughout their complete arcuate surfaces. All the advantages of an articulated anchorage is present. The manually applied effort need be only enough to oppositely reciprocate the plates 61 and 69, whereupon the rotating drum will serve to rotate the two plates as a unit about the central hub to apply the two main shoes. The construction is comparatively simple and relatively inexpensive although exceedingly efficient. It will withstand severe treatment since so large an area of the drum is engaged that distortion of the drum is avoided. Preferably the drum is provided with cooling ribs as shown in Fig. 2 to prevent the heat, under the influence of severe frictional engagement, from expanding the drum and lessening the braking efficiency.

Another advantageous characteristic is found in this brake in that it avoids the necessity for adjustment. As the lining on the main shoes wears away, a somewhat greater rotation of the servo shoes takes place with no sacrifice in pedal travel, since the only purpose of pedal travel is to move the plates 61 and 69 diametrically into drum contact. Also there is no need to adjust the servo shoes because the travel of the wheel cylinder to accommodate the lining wear of the servo shoes is always within the range of movement at the master cylinder provided by one stroke of the brake pedal.

I claim:

1. In a brake, a drum, oppositely located main shoes, means to anchor either end of each main shoe, servo shoes between the adjacent ends of the main shoes, means to force said servo shoes into contact with the drum whereby the servo shoes apply the main shoes in either direction of drum rotation, said anchoring means including anchor pins and articulating links pivoted to said shoes and engaging said pins.

2. In a brake, a drum, oppositely located main shoes, means to anchor either end of each main shoe, servo shoes between the adjacent ends of the main shoes, means to force said servo shoes into contact with the drum whereby the servo shoes apply the main shoes in either direction of drum rotation, said means comprising oppositely reciprocable plates carrying said servo shoes and a hydraulic cylinder and piston assembly between said plates.

3. In a brake, a rotatable drum, a fixed anchor plate, anchor pins carried by said anchor plate, a centrally disposed hub carried by said anchor plate, main shoes, articulating links between the ends of said shoes and said anchor pins, oppositely reciprocable plates guided by and jointly rotatable upon said hub, servo shoes carried by said plates, means to reciprocate said reciprocable plates and spread said servo shoes whereby the servo shoes apply said main shoes as the rotating drum rotates said plates in unison about said hub.

4. The invention defined by claim 3, said means comprising a hydraulic cylinder between said reciprocable plates.

5. In a brake, a drum, main shoes therein, servo shoes between the ends of the main shoes, anchors for said main shoes at either end and means to spread said servo shoes to contact the drum whereby the drum as it rotates rotates the servo shoes which apply the main shoes for either direction of drum rotation, said means comprising a hydraulic cylinder rigid with one of said servo shoes and a piston therein movable relatively thereto and engaging a part rigid with the other servo shoe.

GILBERT K. HAUSE.